(12) United States Patent
Hughes et al.

(10) Patent No.: US 11,269,790 B2
(45) Date of Patent: Mar. 8, 2022

(54) IMPLEMENTING AND CONFIGURING A UNIVERSAL I/O CARD FOR A PROCESS CONTROL I/O NETWORK

(71) Applicant: EMERSON PROCESS MANAGEMENT POWER & WATER SOLUTIONS, INC., Pittsburgh, PA (US)

(72) Inventors: Rodger Hughes, Plum Borough, PA (US); Richard W. Kephart, Jr., Kittanning, PA (US); Steven J. Schilling, Pittsburgh, PA (US); Timothy R. Piper, Monroeville, PA (US)

(73) Assignee: EMERSON PROCESS MANAGEMENT POWER & WATER SOLUTIONS, INC., Pittsburgh, PA (US)

( * ) Notice: Subject to any disclaimer, the term of this patent is extended or adjusted under 35 U.S.C. 154(b) by 171 days.

(21) Appl. No.: 16/452,129

(22) Filed: Jun. 25, 2019

(65) Prior Publication Data
US 2020/0334173 A1    Oct. 22, 2020

Related U.S. Application Data

(60) Provisional application No. 62/835,627, filed on Apr. 18, 2019.

(51) Int. Cl.
*G06F 15/16* (2006.01)
*G06F 13/12* (2006.01)
(Continued)

(52) U.S. Cl.
CPC ....... *G06F 13/122* (2013.01); *G05B 19/0425* (2013.01); *G06F 13/385* (2013.01); *G06F 2213/3808* (2013.01)

(58) Field of Classification Search
CPC ................ G06F 13/122; G05B 19/0423
(Continued)

(56) References Cited

U.S. PATENT DOCUMENTS 8,762,618 B2 *  6/2014  Burr ................... G06F 13/36
                                                710/315
9,083,548 B2   7/2015  Holmes et al.
(Continued)

FOREIGN PATENT DOCUMENTS

WO   WO-2017066308 A1   4/2017

OTHER PUBLICATIONS

DeltaV Distributed Control System, DeltaV™ CHARMs Commissioning, Retrieved from the Internet at: <http://www.emerson.com/documents/automation/deltav-charm-commissioning-en-56728.pdf> May 17, 2018.
(Continued)

*Primary Examiner* — Hee Soo Kim
(74) *Attorney, Agent, or Firm* — Marshall, Gerstein & Borun LLP

(57) ABSTRACT

A U-I/O card improves on traditional I/O cards by enabling configuration of each I/O channel on each U-I/O card to operate according to a desired signal type (e.g., AI, AO, DI, or DO). Thus, each I/O channel of a given U-I/O card may be coupled to any type of field device. The U-I/O card thus simplifies I/O network design, wiring, configuration, commissioning, redesign, and rewiring. The U-I/O card also improves space efficiency in marshalling cabinets and eliminates inefficient use of I/O cards relative to traditional I/O cards.

23 Claims, 7 Drawing Sheets

(51) Int. Cl.
*G06F 13/38* (2006.01)
*G05B 19/042* (2006.01)

(58) Field of Classification Search
USPC .......................................................... 709/217
See application file for complete search history.

(56) References Cited

U.S. PATENT DOCUMENTS

| | | | |
|---|---|---|---|
| 9,411,769 B2 | 8/2016 | Erni et al. | |
| 9,495,313 B2 | 11/2016 | Burr et al. | |
| 2008/0080395 A1* | 4/2008 | Law | H04L 41/0803 370/254 |
| 2012/0232869 A1* | 9/2012 | Maturana | G05B 17/02 703/7 |
| 2015/0019191 A1* | 1/2015 | Maturana | G05B 19/0423 703/13 |
| 2015/0278144 A1* | 10/2015 | McLaughlin | G06F 13/4027 710/104 |
| 2018/0224832 A1* | 8/2018 | Jundt | G05B 19/4185 |
| 2018/0231959 A1* | 8/2018 | Jundt | G05B 19/414 |
| 2019/0094828 A1* | 3/2019 | Prakash | G06F 3/04842 |
| 2019/0324429 A1* | 10/2019 | O'Connell | G05B 19/0423 |
| 2020/0278652 A1* | 9/2020 | Aradhyula | G05B 19/0423 |

OTHER PUBLICATIONS

DeltaV™ DeltaV Distributed Control System, DeltaV Electronic Marshalling, Retrieved from the Internet at: <http://www.emerson.com/documents/automation/deltav-electronic-marshalling-en-56832.pdf> May 17, 2018.

DeltaV™, Function Block Reference, Retrieved from the Internet at: <https://docuri.com/queue/deltav-function_59a8d6f5f581719e12adcf16_pdf?queue_id=59c9f76ef58171c60328bb9d> Jun. 6, 2018.

DeltaV Distributed Control System, DeltaV™ IS Electronic Marshalling, Retrieved from the Internet at: <http://www.emerson.com/documents/automation/deltav-electronic-marshalling-en-57016.pdf> Jun. 6, 2018.

PutmanMedia®, I/O at Your Fingertips, Retrieved from the Internet at: <http://www2.emersonprocess.com/siteadmincenter/PM%20Articles/IO-at-Your-Fingertips.pdf> Jun. 6, 2018.

DeltaV™, White Paper, "Simplify Commissioning to Shorted Project Timelines", Retrieved from the Internet at: <http://docplayer.net/22962420-White-paper-simplify-commissioning-to-shorten-project-timelines.html> Jun. 6, 2018.

DeltaV™, DeltaV Distributed Control System, Smart Commissioning, Retrieved from the Internet at:<http://www2.emersonprocess.com/siteadmincenter/PM%20DeltaV%20Documents/Whitepapers/dv_wp_SmartCommissioning.pdf> Jun. 6, 2018.

* cited by examiner

IMPLEMENTING AND CONFIGURING A UNIVERSAL I/O CARD FOR A PROCESS CONTROL I/O NETWORK

RELATED APPLICATIONS

This application claims priority to and the benefit of U.S. Application Ser. No. 62/835,627, filed Apr. 18, 2019 and titled "IMPLEMENTING AND CONFIGURING A UNIVERSAL I/O CARD FOR A PROCESS CONTROL I/O NETWORK," the entire disclosure of which is expressly incorporated herein by reference.

TECHNICAL FIELD

The present disclosure relates generally to process plants and process control systems, and, more particularly, to techniques for implementing and configuring a universal I/O card for a process control I/O network.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network, and to one or more field devices via analog, digital, or combined analog/digital buses.

The field devices, which may be, for example, valves, valve positioners, switches and transmitters (e.g., temperature, pressure, and flow rate sensors), perform functions within the process or plant such as opening or closing valves, switching devices on and off, and measuring process parameters.

The process controllers, which are typically located within the plant environment, receive signals indicative of process measurements made by the field devices or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices.

Execution of the control modules causes the process controllers to send the control signals over the communication links or signal paths to the field devices, to thereby control the operation of at least a portion of the process plant or system, e.g., to control at least a portion of one or more industrial processes running or executing within the plant or system. For example, the controllers and the field devices control at least a portion of a process being controlled by the process plant or system.

Input/output (I/O) cards (sometimes called "I/O devices" or "I/O modules"), which also are typically located within the plant environment, generally are communicatively disposed between a controller and one or more field devices, and enable communications there between, e.g. by converting electrical signals into digital values and vice versa. Typically, an input or output for a field device is communicatively coupled to a process controller via one or more I/O cards configured for the same communication protocol or protocols as those utilized by the field device inputs and outputs. Specifically, field device inputs and outputs are typically configured for either analog or discrete communications. In order to communicate with a field device, a controller generally needs an I/O card configured for the same type of input or output utilized by the field device. That is, for a field device configured to receive analog control signals (e.g., a 4-20 mA signal), the controller needs an analog output (AO) I/O card to transmit the appropriate control signal; and for a field device configured to transmit measurements or other information via an analog signal, the controller typically needs an analog input (AI) card to receive the transmitted information. Similarly, for a field device configured to receive discrete control signals, the controller needs a discrete output (DO) I/O card to transmit the appropriate control signal; and for a field device configured to transmit information via a discrete signal, the controller needs a discrete input (DI) I/O card. Further, some I/O cards are configured for resistance temperature detectors (RTD) (which vary the resistance of the a wire with temperature) or thermocouples (TC) (which generate a voltage proportional to a temperature). Generally, each I/O card can connect to multiple field device inputs or outputs, wherein each communication link to a particular input or output is referred to as an "I/O channel" (or, more generically, "channel"). For example, a 120 channel DO I/O card can be communicatively connected to 120 distinct discrete field device inputs via 120 distinct DO I/O channels, enabling the controller to transmit (via the DO I/O card) discrete control output signals to the 120 distinct discrete field device inputs.

As utilized herein, field devices, controllers, and I/O devices are generally referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the field devices and the controllers is usually made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

As an example, the DeltaV™ control system and Ovation™ distributed control system (DCS) sold by Emerson each includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines.

Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process plant (or a portion of a plant) is brought online after a multi-step process including a design phase, an installation phase, and a commissioning phase. During the design phase, designers develop general control strategies and identify process elements (i.e., identify the equipment and process control devices needed to implement the control strategies). During the installation phase, process elements are installed. During the commissioning phase, the process elements are tested and generally brought to the point where the system or plant can operate as intended. Unfortunately, it is difficult to fully design some aspects of a plant before beginning installation and commissioning. These phases may be somewhat iterative in nature, and may be performed at least partially in parallel.

For example, designing the I/O network or subsystem is a complicated multi-step process. For decades, a dedicated I/O architecture has been utilized wherein each controller has one or more dedicated multi-channel I/O cards that are physically connected to a controller via a backplane (sometimes referred to as a "controller backplane," "controller bus," "controller link," or "controller channel"). Unfortunately, designing this dedicated I/O architecture is a significant undertaking. First, process and instrumentation diagrams ("P&IDs") are designed, providing an early view of the control elements and how they are intended to be used in the control strategies. Then, an instrument list is derived from these P&IDs, which is a detailed list of each element (e.g., field device) in the design, including the device type, manufacturer, calibration ranges, etc., as well as the physical location of each element within the process equipment. However, the field wiring design generally cannot be completed until the I/O subsystem is defined, and the I/O subsystem generally cannot be defined until the field signal usage is defined in the control strategies so that the signal and the control strategy can be assigned to an appropriate controller. Once the signal count for each controller is known, only then can the actual I/O subsystem for each controller be specified, enabling completion of the field wiring design.

Unfortunately, project changes and redesigns often disrupt and complicate field wiring installation. Typically, after the field wiring design is completed, the physical communication links can be installed to build the I/O network. Traditionally, "wired marshalling" has been the accepted industry practice for establishing the physical communication links (e.g., two or three wire links). This wired marshalling is a significant undertaking, in which field technicians wire field devices to terminal blocks in a field junction box ("FJB"), and then wire those FJB terminal blocks to a first set of terminal blocks in a marshalling cabinet in an I/O room (sometimes called a "control room"). The field technician then wires the first set of terminal blocks in the marshalling cabinet to a second set of terminal blocks in the marshalling cabinet, which is then wired to an appropriate I/O card in a "system cabinet." This I/O card is typically communicatively coupled to a controller (e.g., via a backplane) assigned to control or monitor the field devices in question.

The marshalling cabinet represents a communication interconnection point that can be a source of problems during the design and commissioning phases. Because wires typically come from the field (through multi-core cables) to the marshalling cabinet, the wiring in the cabinet generally must be cross-marshalled to ensure each connected field device is connected to its appropriate I/O card and channel. Specifically, the field devices are typically connected to a first set of terminals in the marshalling cabinet and the I/O cards are typically connected to a second set of terminals in the marshalling cabinet. To ensure proper operation, each terminal in the first set of terminals must be wired to the proper terminal in the second set of terminals (i.e., cross-marshalled) to ensure that, e.g., when the controller attempts to send a command to a field device, the intended field device receives the command.

Cross-marshalling can cause problems. Particularly, "mapping errors" may occur at multiple points. As a first example, a field device output may be wired to the wrong terminals in a marshalling cabinet and thus to the wrong I/O card channel, resulting in the information transmitted by the field device being assigned to the wrong system variable (e.g., when the field device is mistakenly wired to an I/O card of the same type as the correct I/O card), or resulting in a controller simply being unable to receive information transmitted by the field device (e.g., when the field device is mistakenly wired to an I/O card of a different type than the correct I/O card). As a second example, even if the field device is correctly wired to the marshalling cabinet, the wiring between the marshalling cabinet and the I/O card may be incorrect, resulting in the same problems. As a third example, even if the field device and the I/O card are each correctly wired to the marshalling cabinet, errors in cross-marshalling may result in the same problem. Further still, even if all of the wiring is correct, an engineer may mistakenly assign a wrong system variable to the I/O channel, resulting in errors. Identifying the source of errors and determining whether these errors stem from wiring errors or from software configuration errors can be incredibly time and labor intensive. Simply put, like the maze of cords behind billions of televisions across the world, it becomes harder and harder to keep track of where wires are coming or going—making human error far more likely.

Exacerbating issues, the field wiring activities often need to begin long before the I/O subsystem(s) design can be completed. This creates a period of uncertainty in the design, where assumptions are made based on available information that is subject to change due to project scope changes or due to control logic changes resulting in hardware changes. These late changes can be costly, especially if field devices must be redistributed to new controllers. These changes can be costly not only due to the rewiring of communication links to new I/O cards, but also due to the extra cabinet space required to accommodate the additional equipment.

Simply put, any addition of a process control device or other element in the I/O network to accommodate late design changes will add cost as these changes impact the engineering drawings, the field wiring, and sometimes the system cabinet footprint. Inevitably, every project sees its share of late changes. These changes can come from: changes in the control strategy design; late definition of skid equipment requirements; underestimation of the required control CPU capacity; adding field devices; changing device types (e.g., replacing limit switches with analog transmitters); etc.

These late project changes—a common issue—around I/O requirements can have a domino effect across the entire implementation. They can result in drawing rework, control system partitioning, moving wires, and building new cabinets. Even something as simple as replacing an installed field device can be complicated. For example, if an installed field device that is connected to a DO I/O card is replaced with a new field device configured to receive control commands via an analog signal, the field technician needs to find an AO I/O card with empty channels or install a new AO I/O card. The field technician may then need to remove the wiring between the field device and the marshalling cabinet, the wiring between the terminals in the marshalling cabinet, and the wiring between the marshalling cabinet and I/O card. Finally, the field technician needs to wire the new field device to the marshalling cabinet, wire the new I/O card to the marshalling cabinet if necessary, and ensure the cross-marshalling in the marshalling cabinet correctly couples the appropriate terminals within the marshalling cabinet.

In sum, all late changes add time, cost, and risk to a project—an issue that is only amplified by the inflexibility of traditional dedicated I/O architectures and the cross-marshalling that is necessary to ensure that field devices are communicatively coupled to the appropriate I/O card and I/O card channel.

As for commissioning, generally the commissioning of a process plant or system involves bringing various components of the plant or system to the point where the system or plant can operate as intended. After process elements have been installed, at least some of the process elements are commissioned. For example, field devices, sampling points, or other elements are subject to being commissioned. Commissioning is an involved and complex process which typically includes multiple actions or activities. For example, commissioning may include actions or activities such as, inter alia, verifying or confirming an identity of an installed process control device (such as a field device) and its expected connections; determining and providing tags that uniquely identify the process control device within the process control system or plant; setting or configuring initial values of parameters, limits, etc. for the device; verifying the correctness of the device's installation, operation, and behaviors under various conditions, e.g., by manipulating signals provided to the devices and performing other tests, and other commissioning activities and actions. Device verification during commissioning is important for safety reasons, as well as to conform to regulatory and quality requirements.

Other commissioning actions or activities are performed on a process control loop in which the device is included. Generally speaking, a "process control loop" includes one or more field devices and a controller configured to communicate with each other for the purpose of implementing a control scheme. For example, a control loop may include a field device that can actuate (e.g., a control valve for an inlet line to a tank) to change a manipulated variable (e.g., the flow of cold water through the pipe when the valve opens); one or more field devices measuring one or more controlled variables impacted by the change in the manipulated variable (e.g., the temperature of water in the tank); and a controller controlling the actuating field device to achieve a desired value for the manipulated variable.

In any event, commissioning actions or activities on a control loop include, for example, verifying that various signals sent across interconnections (e.g., interconnections found in marshalling cabinets) result in expected behavior at both ends of the interconnection, performing integrity checks on the process control loop, generating as-built I/O lists to indicate the actual physical connections of the devices that are implemented within the plant as well as recording other "as-installed" data, to name a few.

Typically, the commissioning of a process plant requires physical devices, connections, wiring, etc. to be installed, set up, and inter-connected in the field environment of the process plant. At the back-end environment of the plant, data that specifically identifies or addresses the various devices, their configurations, and their interconnections is integrated, verified or commissioned, and stored. As such, after the physical hardware has been installed and configured, identification information, logical instructions, and other instructions or data is downloaded or otherwise provided to the various devices disposed in the field environment so that the various devices are able to communicate with other devices.

Of course, in addition to commissioning actions performed in the back-end environment, commissioning actions or activities are also performed to verify the correctness of the connections and operations in the field environment of both the physical and logical devices, both individually and integrally. For example, a field device may be physically installed and individually verified, e.g., power-on, power-off, etc. A port of a field device may then be physically connected to a commissioning tool via which simulated signals may be sent to the field device, and the behavior of the field device in response to the various simulated signals may be tested. Similarly, a field device whose communication port is commissioned may eventually be physically connected to a terminal block at marshalling cabinet, and actual communications between the terminal block and the field device may be tested. Notably, commissioning may reveal errors in system design or field wiring. These errors can result in some of the costly late project changes previously discussed.

Typically, commissioning of field devices or other components in the field environment requires knowledge of component identifications, and in some cases, knowledge of component interconnections so that test signals and responses can be communicated amongst field devices and other loop components and resultant behaviors verified. In currently known commissioning techniques, such identification and interconnection knowledge or data is generally provided to components in the field environment by the back-end environment. For example, the back-end environment will download field device tags that are used in control modules into smart field devices that will be controlled by the control modules during live plant operations.

SUMMARY

Techniques, systems, apparatuses, components, devices, and methods for implementing, in process control I/O networks, universal I/O (U-I/O) cards with configurable I/O channels. The U-I/O cards improve on traditional I/O cards by enabling configuration of each I/O channel on each U-I/O card to operate according to a desired signal type (e.g., AI, AO, DI, or DO). Thus, each I/O channel of a given U-I/O card may be coupled to any type of field device. The U-I/O card thus simplifies I/O network design, wiring, configuration, commissioning, redesign, and rewiring. The U-I/O card also improves space efficiency in marshalling cabinets and eliminates inefficient use of I/O cards relative to traditional I/O cards.

Note, this summary has been provided to introduce a selection of concepts further described below in the detailed description. As explained in the detailed description, certain embodiments may include features and advantages not described in this summary, and certain embodiments may omit one or more features or advantages described in this summary.

DETAILED DESCRIPTION

As discussed above, a process plant, process control system, or process control environment that, when on-line, operates to control one or more industrial processes in real-time may be commissioned utilizing one or more of the novel smart commissioning techniques, systems, apparatuses, components, devices, or methods described herein. The process plant, when commissioned and operating on-line, includes one or more wired or wireless process control devices, components, or elements that perform physical functions in concert with a process control system to control one or more processes executing within the process plant. The process plant or process control system may include, for example, one or more wired communication networks or one or more wireless communication networks. Additionally, the process plant or control system may include centralized databases, such as continuous, batch, asset management, historian, and other types of databases.

I. An Example Plant Environment 5

Figure 1A:
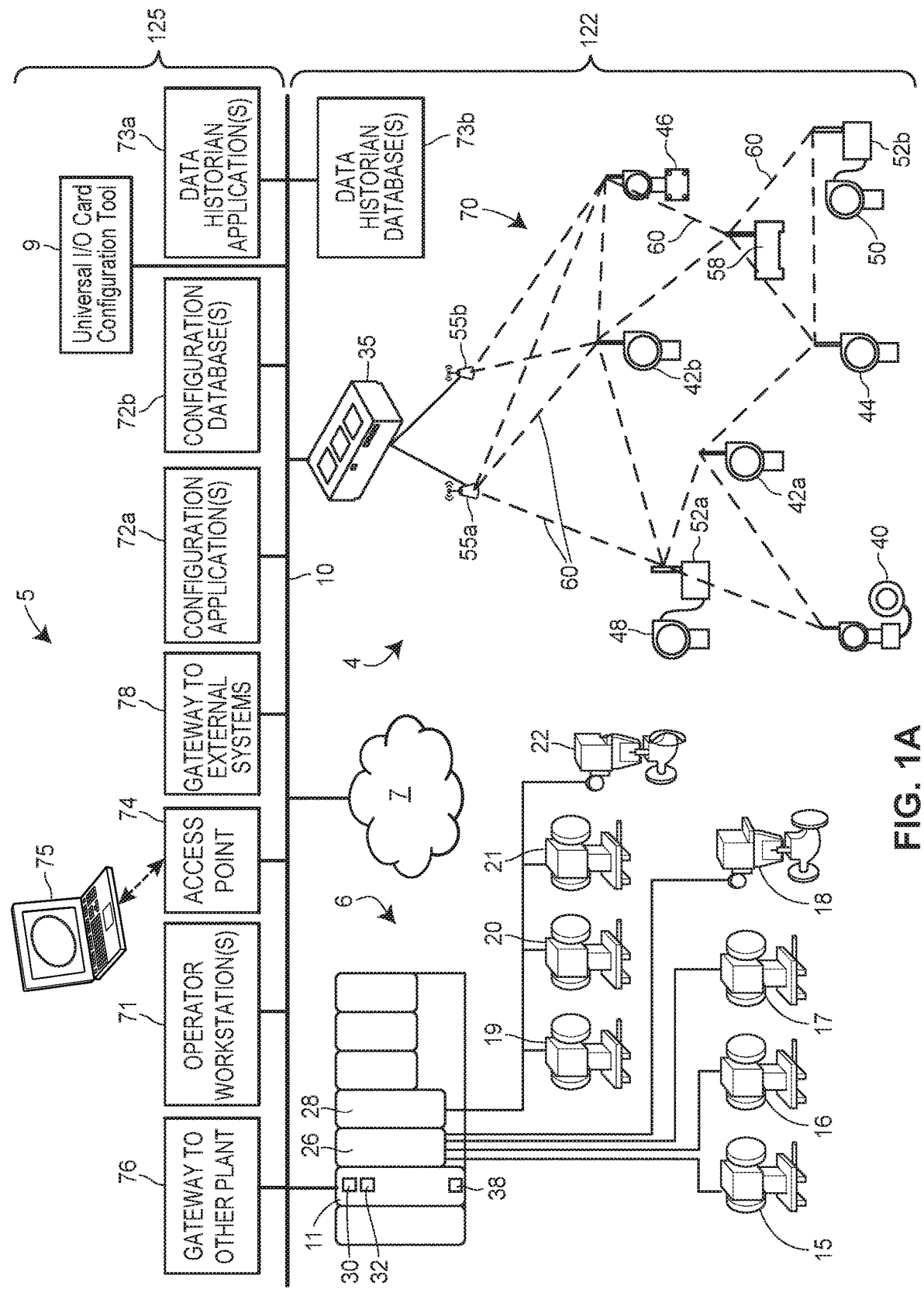
FIG. 1A is a block diagram of an example process plant, process control system, or process control environment 5, including an input/output (I/O) network 7 configured according to one or more of the described universal I/O card management techniques.

FIG. 1A is a block diagram of an example process plant, process control system, or process control environment 5, including an input/output (I/O) network 7 configured according to one or more of the universal I/O card management techniques described herein. Note, in the process control industry, the term "I/O" is sometimes used in a number of related but different contexts. The term generally refers to a logical link or communication channel that communicatively couples a field device to an I/O card or controller (e.g., "I/O channel"), but may be used when referring to a number of other concepts, such as the devices that transmit signals to or receive signals from field devices via I/O channels (e.g., "I/O devices," "I/O cards," or "I/O modules"), connectors or terminals associated with the I/O devices (e.g., "I/O connectors"), the signals transmitted on the I/O channel (e.g., "I/O signals), variables or commands represented by the signals (e.g., "I/O parameters"), or the values of the variables or commands carried by the signals (e.g., "I/O parameter values"). To the extent the term "I/O" is referenced herein without a qualifier, the context of the sentence should make clear which of these concepts is being discussed. Further, it should be understood that an "I/O channel" represents a particular type of "communication channel" or "channel." That is, unless the context of the sentence suggests otherwise, references in this description to the term "channel" or the term "communication channel," without the qualifier "I/O," may refer to a communication link that could be an I/O channel in some implementations, but may also refer to a communication link other than an I/O channel in some implementations.

The process plant 5 controls a process, which may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). As a general matter, at least some of the process outputs are measured and utilized as "control inputs" to one or more controllers controlling the process. The one or more controllers may, in turn, transmit one or more "control outputs," "control signals," or "commands" (which may be thought of as process inputs, or signals that influence process inputs). Generally The process plant or control system 5 of FIG. 1A includes a field environment 122 (e.g., "the process plant floor 122") and a back-end environment 125, each of which are communicatively connected by a process control backbone or data highway 10, which may include one or more wired or wireless communication links, and may be implemented using any desired or suitable communication protocol such as, for example, an Ethernet protocol.

At a high level (and as shown in FIG. 1A), the field environment 122 includes physical components (e.g., process control devices, networks, network elements, etc.) that are disposed, installed, and interconnected to operate to control the process during run-time. For example, the field environment includes an I/O network 6 and an I/O network 7. By and large, the components of each of these I/O networks are located, disposed, or otherwise included in the field environment 122 of the process plant 5. Generally speaking, in the field environment 122 of the process plant 5, raw materials are received and processed using the physical components disposed therein to generate one or more products.

By contrast, the back-end environment 125 of the process plant 5 includes various components such as computing devices, operator workstations, databases or databanks, etc. that are shielded or protected from the harsh conditions and materials of the field environment 122. In some configurations, various computing devices, databases, and other components and equipment included in the back-end environment 125 of the process plant 5 may be physically located at different physical locations, some of which may be local to the process plant 5, and some of which may be remote.

I(A). The Field Environment 122 of the Plant 5

As noted, the field environment 122 includes the I/O networks 6 and 7, each of which may be coupled to the plant network 10. Each I/O network 6 and 7 includes one or more controllers, field devices communicatively connected to the one or more controllers, and intermediary nodes facilitating communication between the controllers and the field devices (e.g., I/O cards).

Each process controller in the process plant 5 implements a control strategy defined by one or more control routines, which may be stored to a memory of the controller. When a processor of the controller executes one or more of the control routines, the controller transmits to a field device a control signal (i.e., a "control output") over wired or wireless process control communication links or networks to other field devices to control the operation of a process in the plant 5. The controller may generate a control signal based on: (i) one or more received signals, which may be referred to as "control inputs" (e.g., one or more received signals representing measurements obtained by field devices), and (ii) the logic of the one or more control routines, which may be defined by one or more software elements (e.g., function blocks). Typically, a controller manipulates a process input (which may be referred to as a "manipulated variable") to change a particular process output (which may be referred to as a "controlled variable" or simply a "process variable") based on feedback (i.e., a measurement of the controlled variable) and a desired value for the process output (i.e., a setpoint).

Generally, at least one field device performs a physical function (e.g., opening or closing a valve, increasing or decreasing a temperature, taking a measurement, sensing a condition, etc.) to control the operation of a process implemented in the process plant 5. Some types of field devices communicate with controllers by using I/O devices (e.g., "I/O cards"). Process controllers, field devices, and I/O cards may be wired or wireless, and any number and combination of wired and wireless process controllers, field devices, and I/O devices may be included in the process plant environment or system 5.

For example, FIG. 1A illustrates a process controller 11 that is communicatively connected to wired field devices 15-22 via input/output (I/O) cards 26 and 28, and that is communicatively connected to wireless field devices 40-46 via a wireless gateway 35 and the data highway 10. In some configurations (not shown), the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV™ or Ovation™ controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, or any smart communication protocol such as the FOUNDATION® Fieldbus protocol, the HART® protocol, the WirelessHART® protocol, etc. In FIG. 1A, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1A includes a processor 30 that implements or oversees one or more process control routines 38 (e.g., that are stored in a memory 32). The processor 30 is configured to communicate with the field devices 15-22 and 40-46 and with other nodes communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

The controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control system 5 (sometimes referred to as "output blocks"). Of course, hybrid and other types of function blocks exist.

Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 38 may implement one or more control loops which are performed by executing one or more of the function blocks.

The wired field devices 15-22 may be any types of devices, such as sensors, valves, transmitters, positioners, etc., while the I/O cards 26 and 28 may be any types of process control I/O devices conforming to any desired communication or controller protocol. In FIG. 1A, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 or at least some of the I/O cards 26, 28 additionally or alternatively communicate with the controller 11 using the process control data highway 10 or by using other suitable control system protocols (e.g., Profibus, DeviceNet, Foundation Fieldbus, ControlNet, Modbus, HART, etc.).

In FIG. 1A, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, or other nodes or devices of the process control plant 5. For example, the wireless gateway 35 may provide communicative coupling by using the process control data highway 10 or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1A, a field device 48 of FIG. 1A is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1A, the wireless devices 40-46 and 52-58 communicate with each other and with the wireless gateway 35 over wireless links 60 of the wireless communications network 70, or via the process control data highway 10.

I(B). The Back-End Environment 125 of the Plant 5

As noted, the back-end environment 125 includes various components such as computing devices, operator workstations, databases or databanks, etc. that are typically shielded or protected from the harsh conditions and materials of the field environment 122. The back-end environment 125 may include any one or more of the following, each of which may be communicatively connected to the data highway 10: (i) one or more universal I/O card configuration tools 9; (ii) one or more operator workstations 71; (iii) a configuration application 72a and a configuration database 72b; (iv) a data historian application 73a and a data historian database 73b; (v) one or more other wireless access points 74 that communicate with other devices using other wireless protocols; and (vi) one or more gateways 76, 78 to systems external to the immediate process control system 5.

Figure 3:
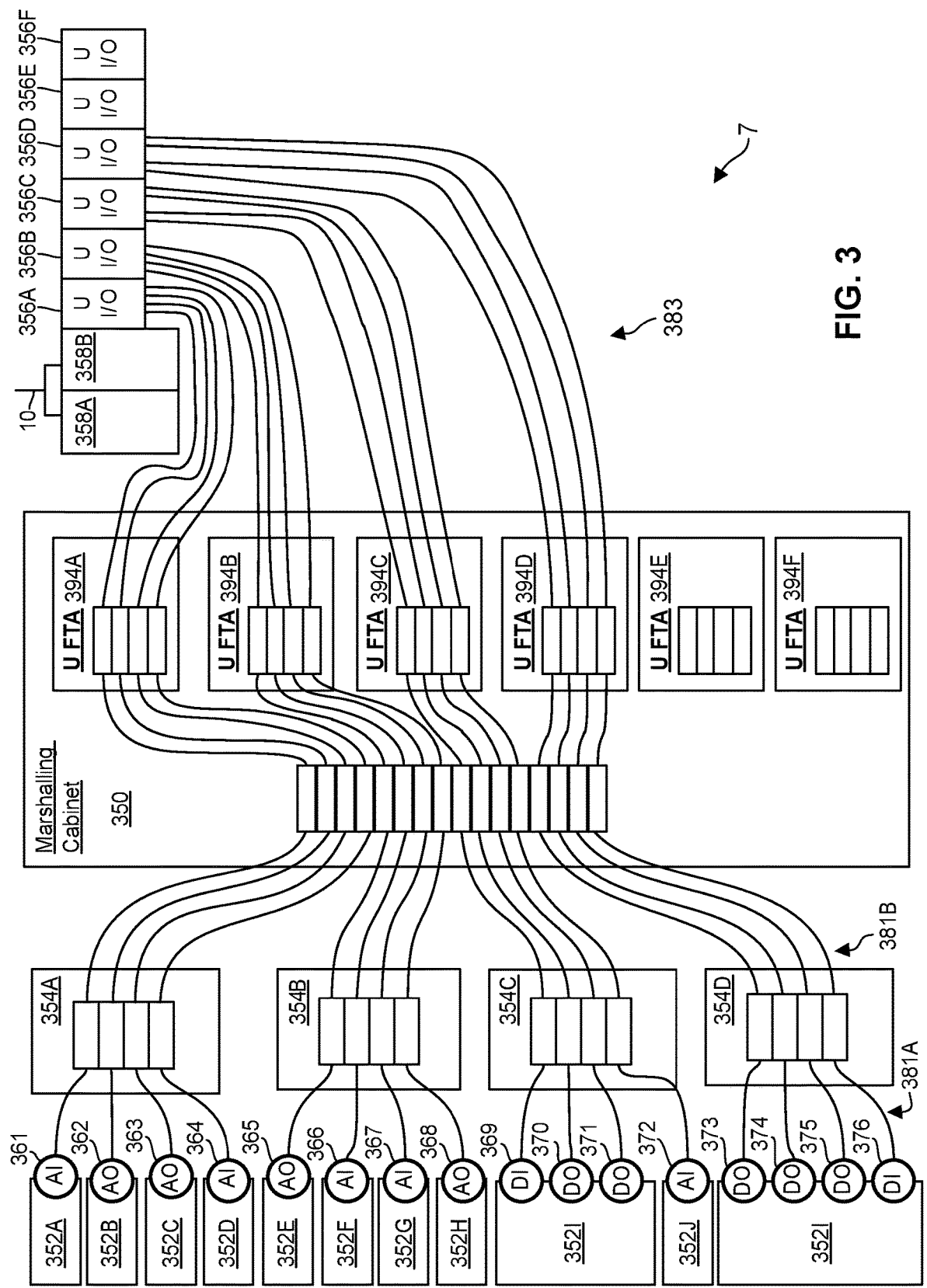
FIG. 3 is a block diagram depicting the I/O network shown in FIG. 1A, which includes universal I/O (U-I/O) cards including software configurable I/O channels.
Figure 4:
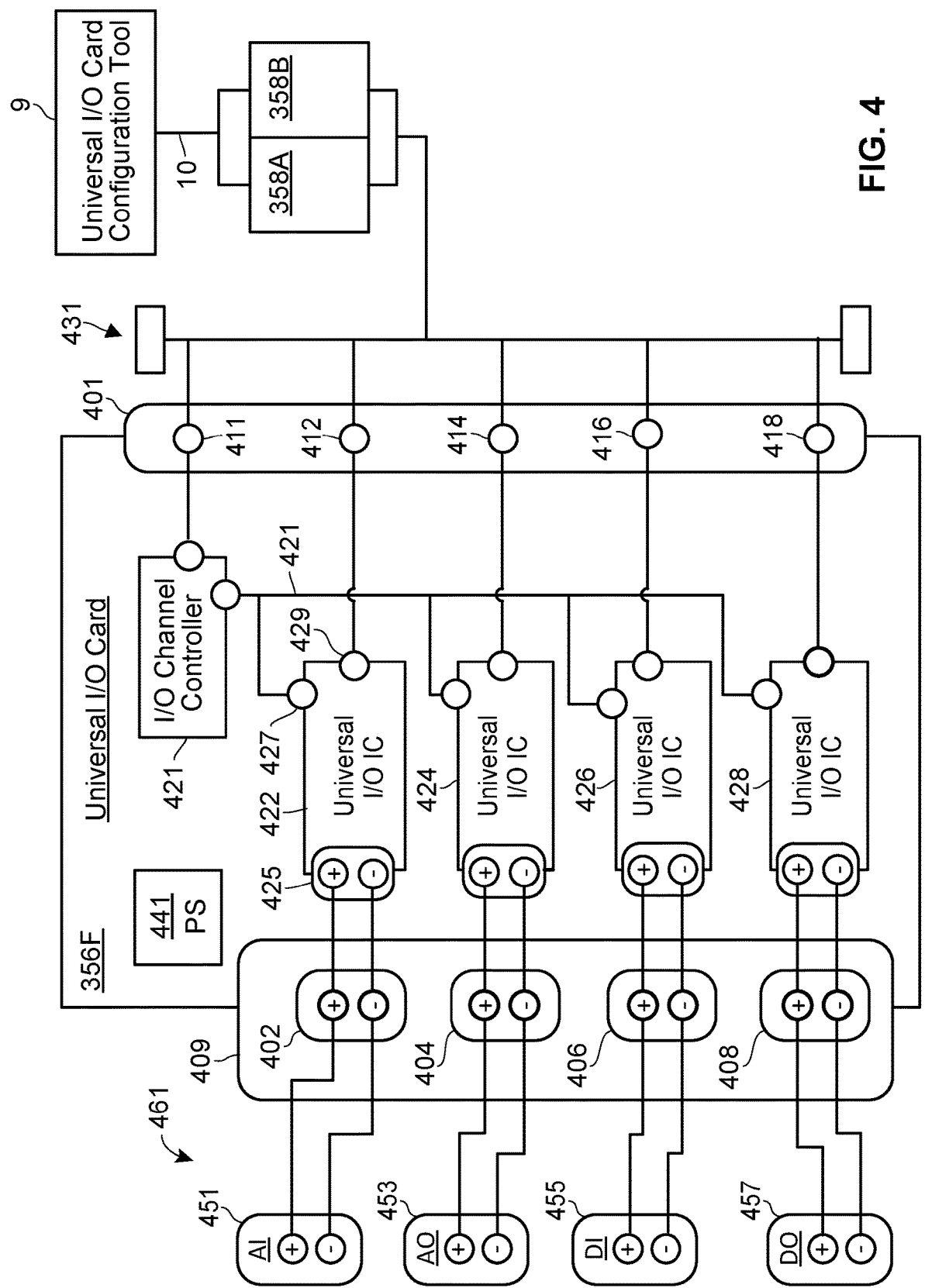
FIG. 4 is a block diagram of the U-I/O card shown in FIG. 3.

The universal I/O card configuration tool 9 may be utilized by users to configure universal I/O cards, such as those included in the I/O network 7 and shown in FIGS. 3 and 4. The tool 9 may be a routine or set of instructions implemented by a host computer, such as the workstation 71 or the user interface 75. The host computer may include a processor, a memory storing the routine, and a communication interface. The communication interface may include a wired or wireless network interface coupling the host to the network 10. Further, the communication interface may include a user interface coupling the host to one or more input/output (I/O) devices. Example I/O devices include displays, touch sensors (e.g., integrated with the display), a mouse, a keyboard, sensors for detecting motion or gestures, etc.

In operation, the tool 9 presents a graphical user interface (GUI) for configuring one or more I/O channels of one or more I/O cards to operate according to a desired type of control signal (e.g., AI, AO, DI, DO). For example, a user may interact with a search bar to search for a tag or ID unique to an I/O card, and may then interact with a "field" element of the GUI shown for each channel (e.g., checkboxes, a dropdown box, a radio button menu, etc.) to select the desired signal type.

The operator workstations 71 may be utilized by operators to view and monitor run-time operations of the process plant 5, as well as take any diagnostic, corrective, maintenance, or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

The one or more other wireless access points 74 enable devices in the back-end environment 125 (and sometimes in the field environment 122) to communicate with other devices using wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58) also communicate using the wireless protocol supported by the access points 74.

The gateways 76 and 78 may interface with systems that are external to the immediate process control system 5. Typically, such systems are customers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1A only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Remaining with FIG. 1A, the configuration application 72a and the configuration database 72b may be utilized to configure certain aspects of the plant 5. Various instances of the configuration application 72a may execute on one or more computing devices (not shown) to enable users to create or change process control modules and download these modules via the data highway 10 to the controllers 11, as well as to enable users to create or change operator interfaces via which in operator is able to view data and change data settings within process control routines. The configuration database 72b stores the created (e.g., configured) modules or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, the configuration database 72b, and the user interfaces thereto (not shown) comprise a configuration or development system 72 for control or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5).

Regarding commissioning, the configuration database 72b may store data and other information that specifically identifies or addresses the various devices or components and their interconnections that are planned for or desired to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and or operator interface modules that will operate in conjunction with the field environment 122 during live operations of the process plant 5. In an example, an approved control module is downloaded into a process controller so that, when executed during live operations, the process controller operates in accordance with its resident control module to send and receive various signals to/from other components in its loop (and, in some cases, to/from other process controllers), thereby controlling at least a portion of the process in the process plant 5.

The configuration database 72b may store a number of logical identifiers of components in the field environment 122, enabling the controller 11 and other devices to reference the components and signals associated with the components by way of the logical identifiers. For example, for a given field device, the configuration database 72b may store information mapping or binding a logical identifier to a particular hardware address or I/O channel. The hardware address may identify a particular controller, a particular I/O card connected to the particular controller, or a particular address for the I/O channel connecting the particular I/O card to the field device. In some instances, this mapping or binding may be stored at the controller 11, the user interface device 75, the operator workstation 71, or any other desired device (e.g., any device needing to resolve the logical identifier). After a logical identifier has been bound to a hardware address or I/O channel, the identifier is considered "assigned." In some cases, the system 5 includes "unassigned" logical identifiers, which are identifiers that a software element (e.g., a control routine or a function block) references but that has no binding. That is, a logical identifier is considered "unassigned" when the system 5 and the configuration database 72b have no hardware address or I/O channel that has been bound to the tag. Thus, when an unassigned logical identifier is referenced by a control routine, no value carried by a signal in the plant 5 will be read and no command will be transmitted via a signal to a field device in the plant 5.

Examples of such logical identifiers include Device Tags (DTs), each of which represents a particular instrument, controller, valve, or other physical field device, and Device Signal Tags (DSTs), each of which represents a particular signal that is received or generated by a particular device and that typically corresponds to a particular parameter utilized by the field device. For some devices, a Device Signal Tag comprises a combination of a device's Device Tag and an identifier of a specific signal received or generated by that device, e.g., an identifier of a specific parameter referenced by a control module. For some devices, typically legacy or dumb devices, a Device Tag represents both the physical device and a signal generated by the device. Generally speaking, a device's logical identifier is used by the process plant 5 in both the field environment 122 and in the back-end environment 125 to uniquely identify the device. The DTs and DSTs may be referred to as "system tags" or "system identifiers."

In some instances, the smart field devices 19-22 also may store logical identifiers unique to the smart field devices 22. These logical identifier may be distinct from the system tags utilized by the plant 5 to identify the field devices 19-22, and may be referred to as "source identifiers" or "source tags." Source tags may or may not be stored at the configuration database 72b, depending on the implementation.

I(C). An Example Control Routine 101 That May Be Found in the Plant 5

Figure 1B:
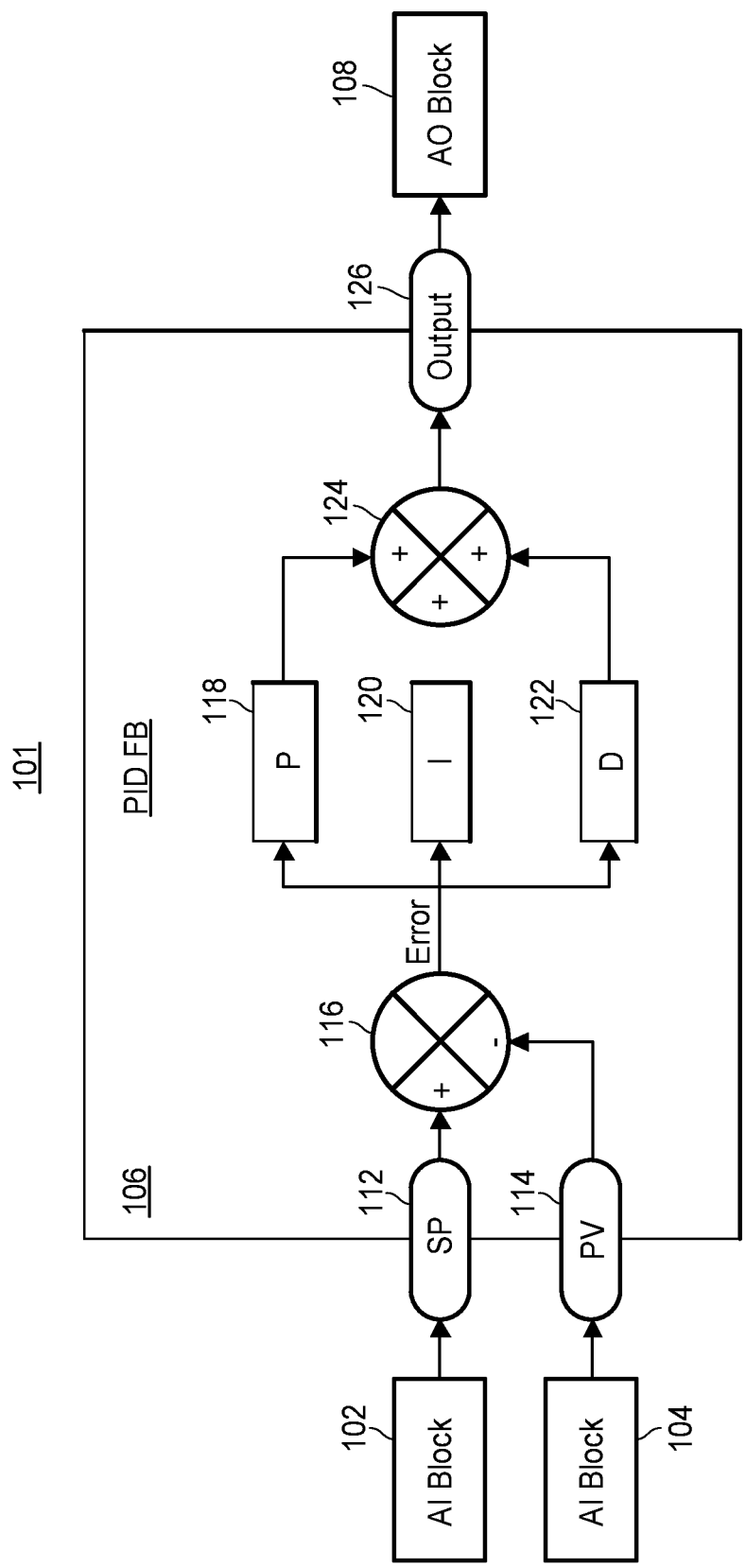
FIG. 1B depicts an example of one of the control routines that may be implemented by the controller shown in FIG. 1A.

FIG. 1B depicts a control routine 101, which is an example of one of the control routines 38 that may be implemented by the controller 11 shown in FIG. 1A. The control routine 101 includes four blocks: an analog input (AI) block 102, an AI block 104, a control block 106, and an AO block 108. Depending on the implementation, the AI blocks 102 and 104 may represent analog signals received (e.g., from a field device) via an I/O channel by an I/O card (e.g., such as one of the universal I/O cards shown in FIGS. 3 and 4). For example, the AI block 104 may be bound to a first DST identifying a particular AI I/O channel at a first I/O card, and the value provided by the AI block 104 may consequently be driven by the value of the signal on the particular AI I/O channel (e.g., a 4-20 ma signal provided by a flow transmitter field device representing a measured flow). Similarly, the AO block 108 may represent an analog signal to be transmitted (e.g., to a field device) via an I/O channel by an I/O card (e.g., such as one of the universal I/O cards shown in FIGS. 3 and 4). To illustrate, the AO block 108 may be bound to a second DST identifying a particular AO I/O channel at a second IO card. Thus, the value fed to the AO block 108 may cause the second I/O card to drive a signal on the particular AO I/O channel based on the value received at the AO block 108 (e.g., the value may cause the second I/O card to drive a 4-20 ma signal via the AO I/O channel to a valve field device to control the valve's position).

The routine 101 is designed and generated utilizing any suitable configuration and design system, such as the configuration application 72a (shown in FIG. 1A) executing on any suitable computing device (e.g., a stationary workstation or desktop, a laptop, tablet, etc.). A designer creates the routine 101 by dragging and dropping each of the blocks from a library onto a canvas area (not shown) displayed by the application 72a. The designer may then instantiate and configure each block, as well as create links between the blocks to define the control routine 101.

While the control routine 101 provides an analog output based on a set of analog inputs, it will be appreciated that control routines implemented by the controller 11 or other controllers in the plant 5 may provide any suitable number of analog or digital outputs based on any suitable number of analog or digital inputs. Inputs to control function blocks and control routines utilized in the plant 5 may be parameter values received from field devices (e.g., via analog input blocks or discrete input blocks) or parameter values received from other control function blocks or other control routines. Likewise, outputs provided by control function blocks and control routines implemented by controllers in the plant 5 may be parameter values or commands that are provided as inputs to other control routines or blocks (e.g., discrete or analog output blocks providing the parameters or commands to field devices, control function blocks such as PID blocks or discrete control blocks, etc.). While the control routine 101 includes the PID function block 106, it will be appreciated that control routines implemented at the plant 5 may utilize other types of control function blocks.

In any event, a designer may design the routine 101 and other control routines implemented by the controllers described herein using the configuration application 72a shown in FIG. 1A. Specifically, a designer may design a routine by adding to a "canvas area" visual representations of blocks he or she wants included in the routine, interacting with the visual representations to configure parameters and logic associated with the blocks (e.g., by clicking on a visual representation to activate a drop-down menu that enables such configuration), and establishing connections between inputs and outputs of blocks to thereby define the flow of information between the blocks and consequently facilitate the design of the logic of the broader control routine. For example, with reference to the control routine 101 specifically, the designer may drag a generic PID block template (not shown) onto the canvas area to instantiate the PID function block 106 shown in FIG. 1B. At a high level, a PID block includes logic for driving a process variable (PV) or controlled variable (CV), such as a temperature level for fluid in a tank, to a desired level or setpoint (SP) by manipulating a manipulated variable (MV), such as a valve position for a control valve on an inlet hot water line. The generic PID block template is configured to: (i) calculate an error 114 between a setpoint 112 and a measured process variable 114; and (ii) apply a proportional term 118, an integral term 120, or a derivative term 122 to the error 116 to produce an output value 126. Generally speaking, the output value 126 represents an additional change to the MV needed to move the PV 114 closer to the setpoint. As an example, a PID block may gradually open a valve over time to avoid overshooting the SP 112, and may consequently rely on feedback of the measured PV 114 to incrementally command a valve open more and more (or less and less as the PV 114 nears the SP 112). When the error 114 is zero, the output 126 will be zero, indicating no further change is necessary to achieve the desired SP 112.

When the designer instantiates the function block 106, she may configure the parameters 118-122 to affect the behavior of the function block 106. For example, the designer may change one or more of the terms 118-122 to cause the block 106 to more aggressively reach the SP 112 at a higher risk of both overshooting the SP 112 and developing oscillation, or may change one or more of the terms to cause the controlled variable to reach the SP 112 at slower and more conservative rate that is less likely to lead to overshoot or oscillation.

The input blocks 102 and 104 may be instantiated by dragging and dropping template AI blocks onto the canvas area and binding each of them to a tag. For example, a designer may bind the AI block 104 to a system tag (e.g., TI-093) unique to a field device measuring the PV (e.g., a temperature) that the designer wants to use as the measured PV 114 for the PID block 106. The user may then draw a link between the AI block 104 and the PV 114 of the function block 106 to cause the AI block 104 to feed the PV 114. A system tag may similarly be bound to the AI block 102. In some cases, a designer may use a tag representing variable that can be changed by the user (e.g., to adjust the setpoint). In some cases, rather than using the AI block 102 as input for the SP 112, the designer may utilize the output of a second function block, thereby implementing cascade control.

Finally, the output block 108 may be instantiated by dragging and dropping a template AO block onto the canvas area and binding it to a tag (e.g., a tag unique to the previously described control valve). The designer may then link the output 126 to the block 108 so that the PID block 106 feeds to AO block 108.

The control system 5 may include a number of other block templates that are configured to use a particular routine or logic configured to derive an output, as well as other control routines that are developed by linking one or more input blocks, control blocks, or output blocks created from templates.

II. An Example Prior Art I/O Network 200 and Direct Marshalling

Figure 2:
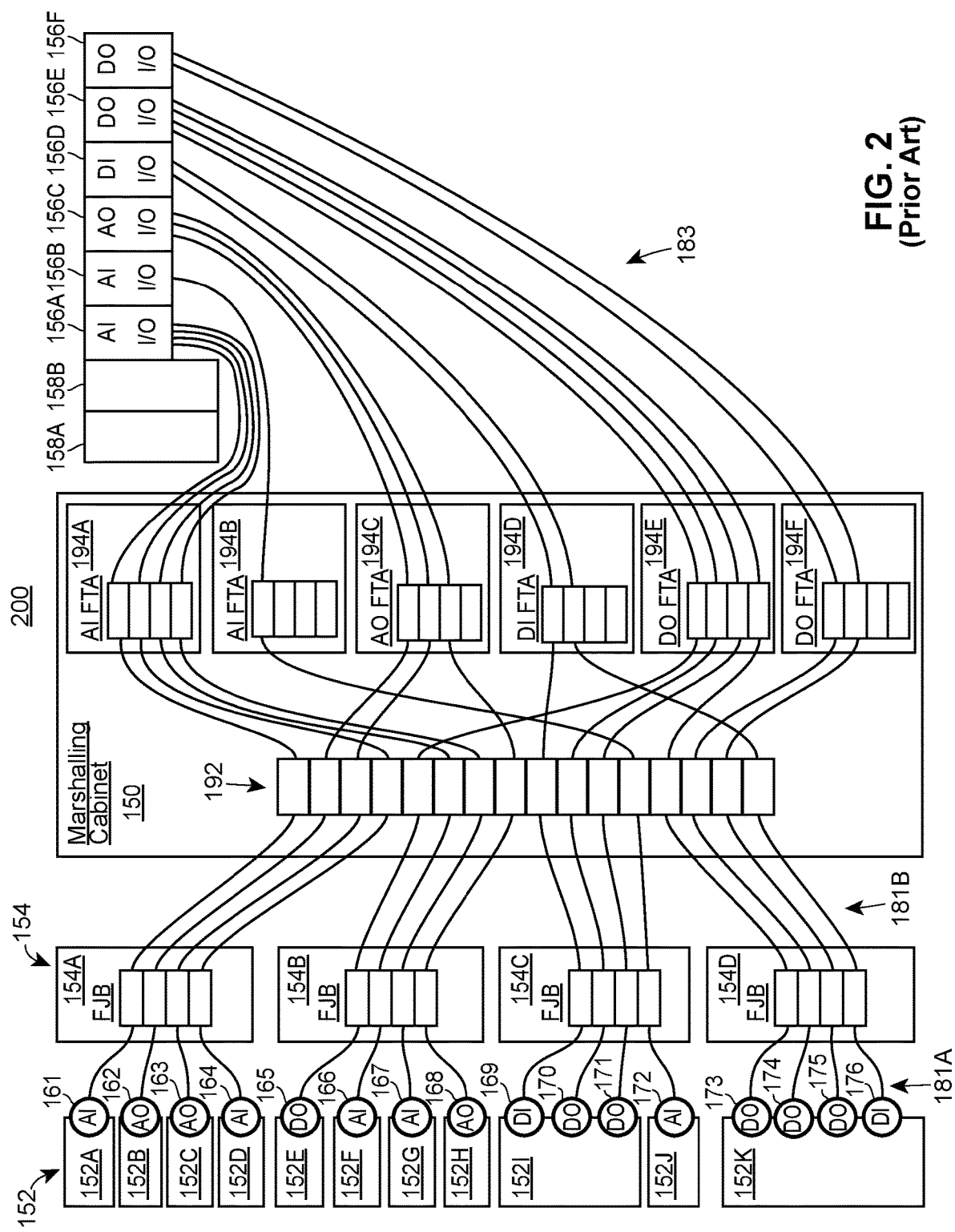
FIG. 2 is a block diagram depicting a prior art I/O network with a dedicated I/O architecture including fixed, dedicated I/O cards and direct marshalling.

FIG. 2 is a block diagram depicting a prior art I/O network 200 with a dedicated I/O architecture including fixed, dedicated, traditional I/O cards 156 and direct marshalling. At a high level, direct marshalling involves wiring each field device I/O to a particular terminal block in a marshalling cabinet; wiring each I/O card channel to a terminal block in a field terminal array (FTA), in the marshalling cabinet, dedicated to that I/O card; and coupling the field device I/Os to the I/O cards by cross-marshalling the terminal blocks and the FTAs in the marshalling cabinet.

Typically, each traditional I/O card 156 is permanently configured for one, and only one, signal type selected from a plurality of signals types (e.g., AO, AI, DI, DO, Resistance Thermal Detector (RTD), or Thermocouple (TC)). For example, the I/O card 156 is permanently configured for AI signal types and cannot be configured or reconfigured to communicate according to AO, DI, DO, RTD, or TC signal types.

The I/O network 200 includes a process controller 158A, a redundant backup controller 158B (collectively "the controller 158") and the traditional I/O cards 156A-F, which are communicatively connected to a set of field devices 152A-K via a marshalling cabinet 150, a set of field junction boxes (FJBs) 154A-D, and a number of wired links 181A, 181B, and 183.

The I/O network 200 enables the process controller 158 to control a process, or a part of a process, via one or more of the field devices 152. Unfortunately, the design of the I/O network 200 is inflexible and difficult to change after field wiring has been completed, making project changes expensive in terms of labor, time, and material.

During the design phase of the I/O network 200, P&IDs are designed, providing an early view of the control elements (e.g., field devices 152) and how they are intended to be used in the control strategies involving the network 200. Then, an instrument list is derived from these P&IDs, which is a detailed list of each element (e.g., field device) in the design, including the device type, manufacturer, calibration ranges, etc., as well as the physical location of each element with in the process equipment. As part of the design phase, designers define the field signals associated with each field device 152 and assign each assigned signal to a controller.

As shown in FIG. 2, each of the field devices 152 has one or more I/O terminals 161-176 for sending or receiving signals, and each of the terminals 161-176 has a specified signal type (e.g., AO, AI, DI, or DO). For the sake of clarity, the terminals are labeled as "input" or "output" from the perspective of the control system. For example, the field devices including the terminals 161, 164, 166, 167, and 172 are each configured to transmit an analog input or "AI" signal (e.g., carrying a process measurement) via the terminals. The field devices including the terminals 162, 163, and 168 are each configured to receive an analog input or "AO" signal (e.g., carrying a control command, such as a command to open a valve) via the terminals. The field devices including the terminals 169 and 176 are each configured to transmit a digital input or "DI" signal via those terminals. The field devices including the terminals 165, 170, 171, 173, 174, and 175 are each configured to transmit discrete output or "DO" signals via those terminals.

As shown in FIG. 2, each of the signals associated with the terminals 161-176 is assigned to the controller 158. A signal count of each type of signal specified for the terminals 161-176 enables designers to determine the number and type of each I/O card 156 necessary to enable the controller 158 to communicate with each of the field device 152 inputs and outputs.

Selecting I/O cards is important because each I/O card 156 (i) has a limited number of I/O channels, and (ii) is configured for a particular type of signal and can only be utilized for that type of signal. Note, the term "I/O channel" refers to the logical link connecting an I/O card or controller to a field device. Each I/O channel may include multiple physical links and points of termination connecting those physical links. The traditional I/O cards 156 are limited to four I/O channels, but it will be noted that some dedicated traditional I/O cards have a different limit on I/O channels (e.g., eight channels). As noted, each I/O card 156 is configured for a particular type of signal and can be utilized only for that type of signal. As an example, the AI I/O card 156A can only send AI signals; it cannot send DI signals or receive DO or AO signals. This requirement, along with the requirement that each of the I/O cards 156 only supports up to four channels, results in unused and wasted terminal blocks. For example, five of the field device terminals 161-176 are configured to transmit an AI signal.

After the design phase is completed, technicians can begin the field wiring phase of development. The I/O terminals 161-176 are wired to the corresponding field junction boxes FJBs 154A-154D, which are then wired to a set of terminals 192 in a marshalling cabinet 150. Note, each of the terminals 161-176 is connected to a corresponding terminal in a FJB and a corresponding terminal 192 in the marshalling cabinet 150. That is, for every I/O terminal 161-176 that exists, a corresponding terminal 192 must be utilized. The set of terminals 192 are wired to field terminal assemblies (FTAs) 194A-194F, each of which is wired to a corresponding I/O card 156A-F.

The process of wiring the terminals 192 to the FTAs 194 is referred to as "cross-marshalling." Cross-marshalling typically is necessary because the organization of wires connecting to the terminals 192 is determined by the physical layout of the plant, while the organization of the FTAs 194 is determined by signal type for the traditional I/O card 156 connected to the FTA. Specifically, field devices sharing close proximity often share a FJB and are wired to the first available terminals 192, resulting in groupings of terminals 192 that roughly correspond to FJBs but that have no other discernible method of organization. By contrast, the FTAs 194 are organized by signal type because each feeds a particular I/O card 156. For example, the FTA 194A corresponds to the AI card 156A. Thus, each of the terminals 194A needs to be connected to a terminal 192 that is connected to an AI channel (i.e., wired to an AI field device terminal). Similarly, the FTA 194C corresponds to the AO card 156C, so each of the terminals in the FTA 194C should be wired to terminals 192 that are wired to AO channels (i.e., connected to AO field device terminals). The terminals of the FTA 194D similarly should serve as an interconnection between the DI card 156D and terminals 192 that are wired to DI field device terminals.

Of note, channel limitations associated with the dedicated traditional I/O cards 156 results in inefficient deployment of I/O cards and unused I/O channels, terminal blocks, and associated cabinet space in the marshalling cabinet 150. Because each of the I/O cards 156 only supports four channels, two AI cards 156A and 156B must be installed and connected to the controller 158, and two corresponding FTAs 194A and 194B must be utilized. For example, the FTA 194B includes three unused terminals and the I/O card 156B has three unused I/O channels due to the signal count requirements and the limitations of the dedicated I/O cards 156. This imperfect match between signal requirements for the field devices 152 and the limitations of the I/O cards 156 results in an inefficient deployment of the I/O cards 156. Despite the fact that the controller 158 is assigned 16 signals, the controller 158 requires six dedicated I/O cards. If the signal count were perfectly distributed by type, the controller 158 would only require four I/O cards.

III. The I/O Network 7 of the Plant 5 and Electronic Marshalling

FIG. 3 is a block diagram depicting the I/O network 7 (also shown in FIG. 1A), which includes universal I/O (U-I/O) cards including software configurable I/O channels, improving cabinet spacing efficiency and enabling easy design, wiring, redesign, and commissioning utilizing the techniques described here.

The I/O network 7 includes a process controller 358A, a redundant backup controller 358B (collectively "the controller 358") and U I/O cards 356A-F, which are communicatively connected to a set of field devices 352A-K via a marshalling cabinet 350, a set of field junction boxes (FJBs) 354A-D, and a number of wired links 381A, 381B, and 383. The link 383 may be referred to as a "controller backplane," a "controller link," a "controller channel," or a "controller bus." The controller 358 may be similar to the controller 11 shown in FIG. 1A (e.g., may be a DeltaV or Ovation controller) and may include similar components to those described regarding the controller 11. In some instances, the controllers 358A and 358B may be physically located on separate backplanes and assemblies.

The field devices 352A-K are similar to the field devices 152A-K shown in FIG. 2 and the field devices 15-22 shown in FIG. 1A. During the design phase of developing the I/O network 7, designers develop an instrument list and define the field signals associated with each of the field devices 352A-K. Like the field devices 152A-K, each of the field devices 352A-K has one or more I/O terminals or connectors 361-376 for sending or receiving signals, and each of the connectors 361-376 has a specified signal type (e.g., AO, AI, DI, or DO). Near the end of the design phase, designers develop a signal count of each type of signal specified for the terminals 361-376. The signal count enables designers to determine the number of U I/O cards 356 necessary to enable the controller 358 to communicate with each of the field device 352 inputs and outputs.

After the design phase is completed, technicians can begin the field wiring phase of development. The I/O terminals 361-372 are wired to the corresponding FJBs 354A-354C, which are then communicatively connected to the CHARMs 393A-L.

III(A). The U-I/O Card 356 of the I/O Network 7

Each of the U-I/O cards 356 is a pluggable/removable electronic component that can be inserted into an apparatus via a socket connected to a backplane to which the controller 358 is also connected. Unlike the traditional I/O cards 156, each of the U-I/O cards 356 is configurable and reconfigurable to communicate according to any one of a plurality of signal types (e.g., AI, AO, DI, DO, RTD, TC, etc.) required by a field device coupled to the U-I/O card 356. Each U-I/O card 356 is bidirectional-capable in that each I/O channel of each U-I/O card 356 can be configured to either: (i) transmit control outputs via signals transmitted to field devices (e.g., AO or DO signals) in response to receiving the control outputs via a message received from a controller (e.g., via a digital message), or (ii) transmit control inputs to a controller (e.g., via a digital message) in response to receiving the control inputs via signals received from one or more field devices (e.g., AI or DI signals). By comparison, the traditional I/O cards 156 are hard wired for AI, AO, DI, or DO, and cannot be reconfigured. The traditional I/O cards 156 are not bidirectional-capable; instead, they are factory-configured to either receive or transmit a particular type of signal (e.g., AI) and cannot subsequently be reconfigured for a different type of signal.

Each U-I/O card 356 may include (i) a first communication interface that communicatively connects to a first link (e.g., a backplane bus supporting digital communications) to the controller 378, and (ii) a second communication interface that communicatively connects to a set of links 383 to a set of field devices (e.g., via terminal blocks and a two, three, or four wire connection between U-I/O card terminals and the field device terminals). One or more of the U-I/O cards 356 may be powered via the first communication interface (e.g., via a backplane bus). The U-I/O cards 356 may be part of a single assembly with the controller 358.

Generally speaking, a U-I/O card is configured to receive a first type of signal (e.g., a digital message carrying multiple commands or values) via the first communication interface and to transmit the information via the second interface and a second type of signal (e.g., an analog or discrete signal carrying a single value), and vice versa. Examples of the second type of signal include standard AI and AO signals (e.g., 4-20 ma, +/−100 mV, +/−250 mV, +/−1 V, +/−5 V, +/−10 V, etc.) and standard DI signals (e.g., 24V, 48V, and 125V differential signals) and DO signals (e.g., 5 to 60 VDC loads up to 500 mA).

A U-I/O card may include an analog-to-digital (A/D) converter and a digital-to-analog (D/A) converter, enabling signal conversion between the digital signals on the first link (e.g., the bus connected to the controller) and analog signals on the second links 383 (e.g., the wiring to the marshalling cabinet and field devices). For example, a U-I/O card 356 may receive an AI signal (e.g., an analog 4-20 mA signal), determine a parameter value based on the current amplitude of the signal, and transmit the parameter value to a controller 358 via a digital communication bus. As a second example, a U-I/O card 356 may receive from the controller 358, via the communication bus, a command or parameter value for a target field device 352 and may transmit an analog or discrete signal, via an appropriate I/O channel, to the target field device 352.

The socket into which a U-I/O card 356 may be inserted includes a terminal block that can be wired to an appropriate field device connector 361-376 to communicatively connect the corresponding field device 352 to the U-I/O card 356. Each of the U-I/O cards 356 may include any desired number of I/O channels and corresponding terminals (e.g., two, four, eight, sixteen, or 32 channels).

Advantageously, the U-I/O cards 356 enable technicians to wire the field devices 352 to any terminal block and FTA within the marshalling cabinet 350 without worrying about cross-wiring problems. The technician can simply wire the field device to a terminal block, an FTA, and the next available I/O channel on the next available U-I/O card.

In example operation, one or more U-I/O cards 356 receive, via a backplane bus, signals from one or more of the field devices 352 via the FTAs 394 and forward information carried by the signals to the controller 358. Further, the U-I/O cards 356 may receive, via the backplane bus and from the controller 358, signals carrying messages including commands, and may forward the commands via the links 383 to the appropriate field devices.

III(B). The Controller 358 of the I/O Network 7

The controller 358, which is similar to the controller 11 shown in FIG. 1A, implements a control strategy defined by one or more control routines stored to a memory of the controller 358. The controller 358 is communicatively connected to other devices in the I/O network 7 via a link (e.g., a bus) to the cards 356 and the links 383, as well as to other devices in the plant 5 via the backbone 10 (also shown in FIG. 1A).

During operation, a processor of the controller 358 executes the control routines, which causes the controller 358 to transmit to one of the field devices 352 a control signal via one of the cards 356 to control operation of a process in the plant 5 via control of the field devices 352. The controller 358 may generate a control signal based on one or more signals received via the cards 356 and the links 383 (e.g., carrying information transmitted by one of the field devices 352) and logic defined by the control routines stored at the controller 358.

Each of the control routines utilized by the controller 358 may be developed by linking and configuring various control elements or function blocks (FBs) 259E representing input functions, control functions, or output functions. Examples of these types of blocks and functions are described with reference to FIG. 1B.

As noted, the configuration database 72b may store bindings for the I/O channels in the network 7. These bindings map a unique tag to a particular I/O channel or subchannel or to a hardware address linked to the I/O channel or subchannel. The bindings allow devices in the plant to read and transmit information (e.g., measurements, indices, commands) by reading and writing to tags unique to the signals carrying variable values and commands. Any desired device in the plant 5 may utilize the tags for reading and writing functions, such as the controller 358, the controller 11, the workstations 71, the historians 73, one or more of the field devices 352, etc.

The hardware address in the binding may identify a particular terminal block address or a particular address for a I/O channel of a U-I/O card 356. For example, a hardware address may take form of "controller.card.channel." For example, the AI 372 of the field device 352J may have an address that looks something like "Controller 358→I/O card 356C→channel 4" or "0358.356C.0004."

Note, some smart field devices are configured to send or receive analog signals via the HART® protocol. The HART® protocol enables a field device or controller to use the loop current magnitude on an I/O channel to send or receive an analog signal (carrying a "primary variable" value) and to superimpose a digital carrier signal on the current loop signal (carrying one or more "secondary variable" values) to enable two-way field communication between the smart field device and the controller. Thus, a smart field device or controller may utilize the superimposed digital carrier signal to transmit and receive secondary variable values in addition to the primary variable value associated with an AI or AO signal. As an example, a smart field device configured for analog signaling may utilize the superimposed carrier signal to transmit the field device's tag, a DST associated with each primary variable and secondary variable, status information about the field device, device alarms, etc. The ability of smart field devices to transmit tags as a secondary variable can be especially helpful when commissioning the field device and configuring the I/O network.

Generally, as used herein, "smart" or "intelligent" field devices are field devices that integrally include one or more processors and one or more memories. As noted, smart field devices are typically analog devices configured to receive or transmit a primary variable value via an AI or AO channel and one or more secondary variable values via a digital signal superimposed on the AI or AO signal.

III(C). The U-I/O Card 356F of the I/O Network 7

FIG. 4 is a block diagram of the U-I/O card 356F (also shown in FIG. 3) including configurable I/O channels. As explained in detail below, the U-I/O card 356F improves on traditional I/O cards by simplifying I/O network design, wiring, configuration, commissioning, redesign, and rewiring. The U-I/O card 356F also improves on space efficiency in marshalling cabinets and eliminates inefficient use of I/O cards relative to traditional I/O cards. Note, while the description below focuses on the card 356F, other U-I/O cards may be configured in a manner similar to the card 356F and may be provide the same or similar functionality.

The card 356F includes: (i) a housing (e.g., a plastic encasement; not shown), (ii) a first communication interface 401 for coupling the card 356F to a one or more field devices 451-457 via a one or more I/O channels 461, (iii) a second communication interface 409 for coupling the card 356F to the controller 358 via a link 431 (e.g., a backplane bus or ethernet connection), (iv) a set of universal I/O integrated circuits (ICs) 422-428, (v) an I/O channel controller 421, and (vi) a power supply 441 configured to power the components of the card 356F. The power supply 441 may draw power from the link 431, which may be a powered bus in some instances. In some instances, the power supply draws power from an external power source other than the link 431.

The first communication interface 401 of the card 356F includes a set of connectors 411-418. At a high level, the interface 401 couples the card 356F to the controller 358

(also shown in FIG. 3) via the link 431 (which may be a bus on a backplane of an integrated assembly to which the controller 358 and card 356F may be affixed or plugged). The I/O channel controller 421 and the ICs 422-428 may communicate with the controller 358 via digital signals. The second communication interface 409 includes a set of connectors 402-408 designed to be communicatively wired to a set of field devices 451-457. The I/O channels 461 formed between the connectors 402-408 and the connectors 402-408 may be AI, AO, DI, or DO channels, depending on the implementation. In the shown example, the first I/O channel 461 to the field device 451 is an AI channel; the second I/O channel 461 to the field device 453 is an AO channel; the third I/O channel 461 to the field device 455 is a DI channel; and the fourth I/O channel 461 to the field device 457 is a DO channel.

Turning to the components of the U-I/O card 356F, each of the ICs 422-428 is a single chip designed to be coupled to an I/O channel 461 and capable of being configured to function as an AI, AO, DI, or DO communicator. Accordingly, each I/O channel 461 corresponding to each IC 422-428 may be any type of channel (e.g., AI, AO, DI, DO), and the IC 422-428 will be capable of communicating via the I/O channel 461 regardless of signal type (the IC 422-428 may require configuration or reconfiguration to make the IC 422-428 compatible with the signal type). Moreover, even if an I/O channel 461 for an IC 422-428 changes (e.g., because of a mistake in wiring or because of a redesign involving the type of field device used), the IC 422-428 can simply be reconfigured for the appropriate signal type. As a result, the I/O network 7 may be designed, wired, configured, redesigned, and rewired with very little effort and time wasted on selecting I/O card types and ensuring the wire-mapping between the field devices and the I/O cards is correct. Put simply, the U-I/O cards 356 and the ICs 422-428 dramatically simplify configuration of the I/O network 7, particularly when compared to the traditional I/O network shown in FIG. 2 utilizing the traditional I/O cards 156. Further, because each IC 422-428 of each card 356 is configurable, the card 356 maximizes the use of I/O channels on each card 356. As an example, the card 356 eliminates a scenario in which three I/O cards are needed for an I/O network consisting of three field devices: an AI device, an AO device, and a DI device. While the network shown in FIG. 2 would require three I/O cards (i.e., AI, AO, and DI cards) each utilizing only a single channel, the I/O network 7 would require a single U-I/O card 356 having a first channel configured for AI, a second channel configured for AO, and a third channel configured for DI.

As noted, each of the ICs 422-428 is a single chip capable of being configured for multiple signals types. The IC 422 includes: (i) a first communication interface 425 (e.g., a set of terminals) configured to be coupled to a field device, (ii) a second communication interface 429 configured to be coupled to the link 431, coupling the IC 422 to the controller 358, and (iii) a signal selector input 427 configured to receive a configuration signal carrying information indicating a signal type (e.g., AI, AO, DI, or DO) for which the IC 422 should be configured. The configuration signal received via the input 427 may be configured according to any suitable format. For example, the configuration signal may be a two-bit signal (e.g., wherein 00=AI, 01=AO, 10=DI, and 11=DO). The ICs 424-428 include similar components.

The I/O channel controller 421 is a set of circuits that generates transmits the configuration signal to the signal selector input 427 of the IC 422. The controller 421 also may provide configuration signals to each of the other ICs 424-428. The controller 421 generates the configuration signals in response to commands received from the control 358 or from the universal I/O card configuration tool 9 (also shown in FIG. 1A) coupled to the controller 358.

III(D). The Universal I/O IC 422 of the I/O Network 7

Figure 5:
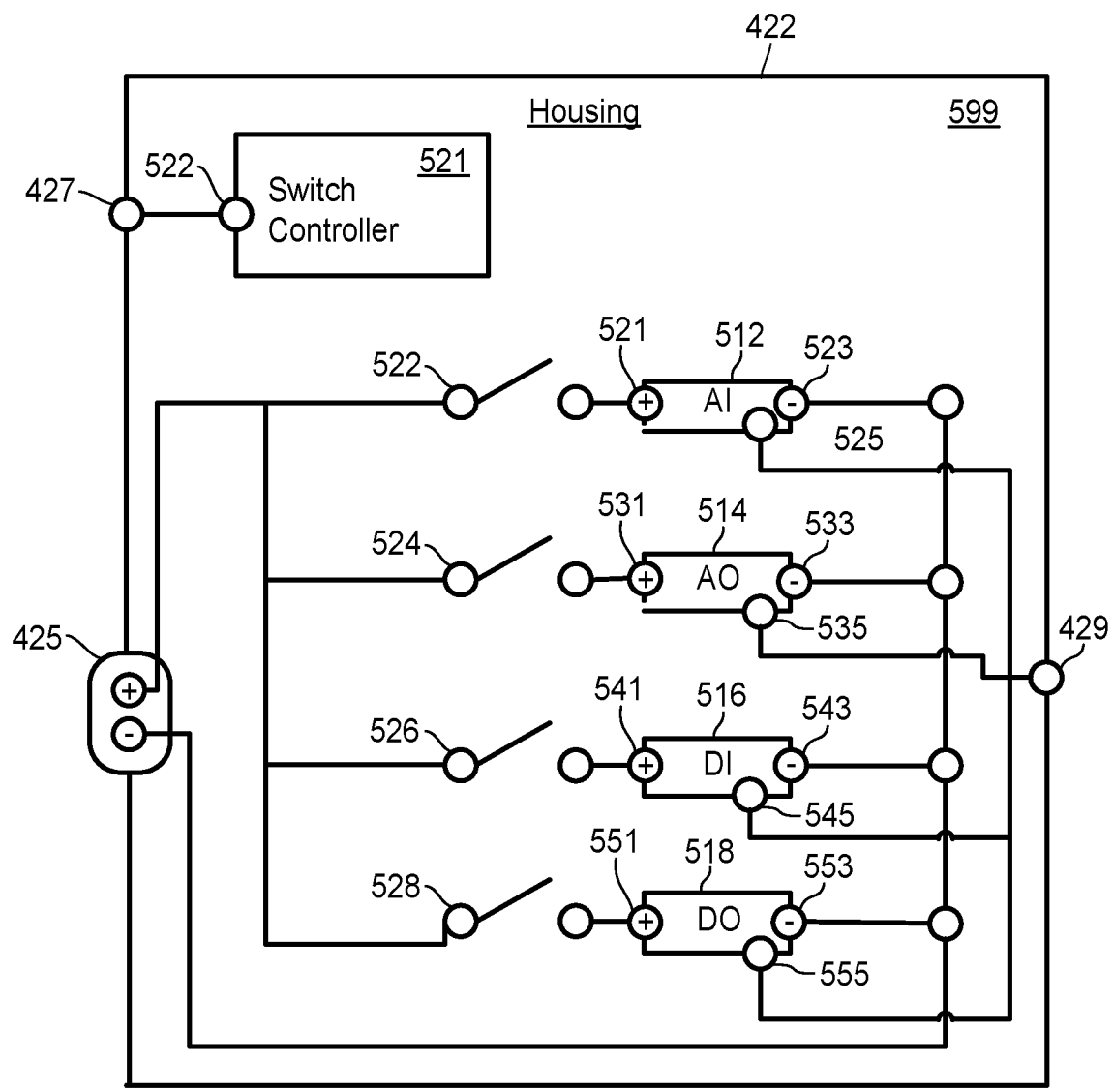
FIG. 5 is a block diagram of an integrated circuit of the U-I/O card shown in FIG. 4.

FIG. 5 is a block diagram of the IC 422 shown in FIG. 4. The IC 422 is a chip designed to be coupled to an I/O channel and capable of being configured to function as an AI, AO, DI, or DO communicator in order to function with any I/O channel type.

The IC 422 includes: (i) a housing 599; (ii) the first communication interface 425 for coupling a field device, via an I/O channel, an active communicator circuit selected from: an AI communicator circuit 512; an AO communicator circuit 514; a DI communicator circuit 516; or a DO communicator circuit 514 (iii) the second communication interface 429 for coupling the controller 358 shown in FIG. 4 to the active communicator circuit; and (iv) the signal selector input 427 for coupling the I/O channel controller 421 shown in FIG. 4 to a switch controller 521.

As noted, the active communicator circuit is selected from one of the circuits 512-518. In operation, the controller 521 actuates one of a set of switches 522-528 to activate the corresponding circuit 512-518 in response to receiving a command from the I/O channel controller 421 indicating a particular circuit to be activated. By actuating one of the switches 522-528, and closed circuit is created with one of the circuits 512-518. The activated circuit then transmits or receives I/O signals (e.g., AI, AO, DI, or DO) via the interface 425 to control or monitor a field device. When one of the switches 522-528 is activated, the others remained deactivated and open.

In some embodiments, the IC 422 may be a set of two or more chips.

III(E). The Communication Circuits 512-518 of the Universal I/O IC 422

Figure 6:
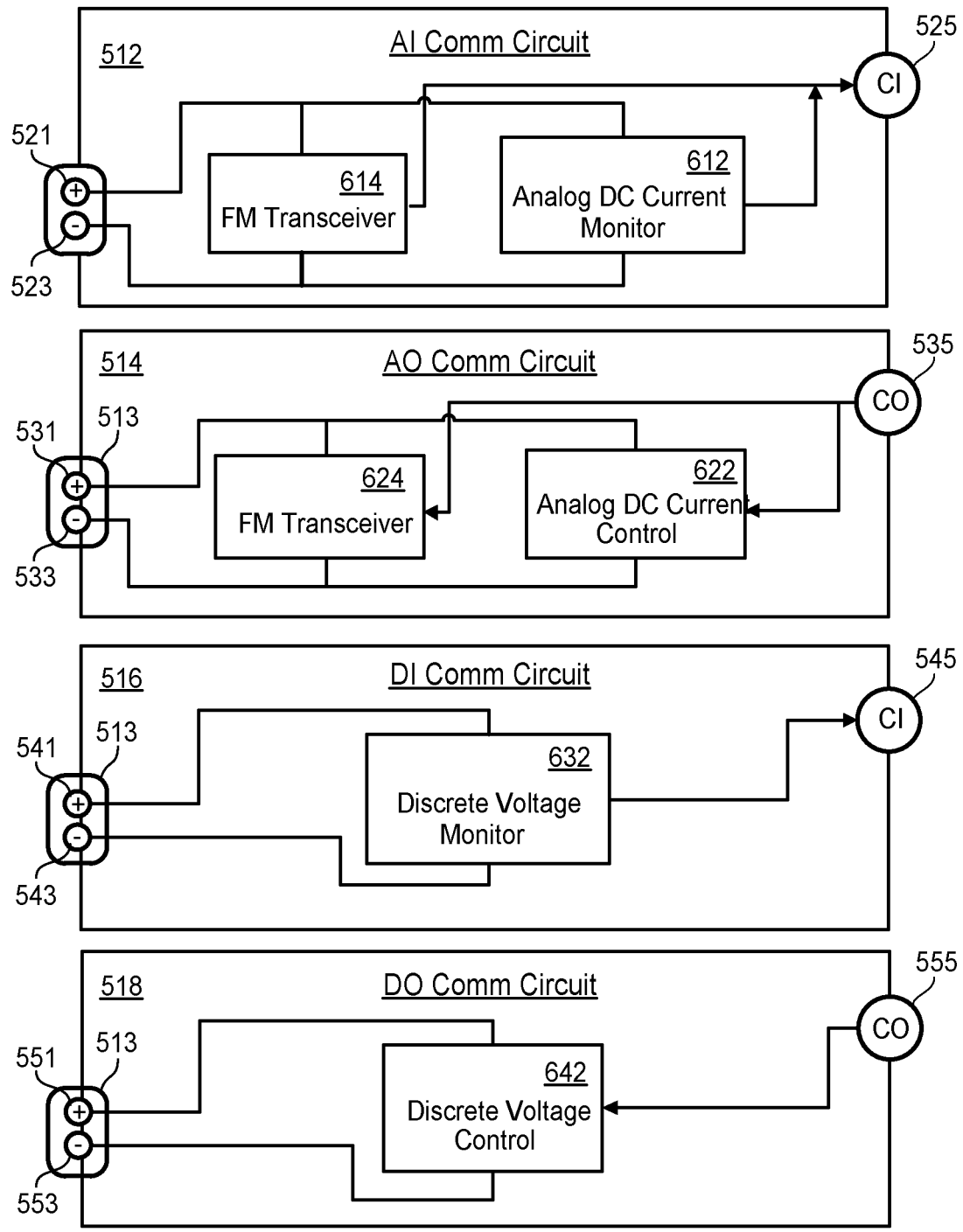
FIG. 6 depicts internal components of the circuits in the integrated circuit shown in FIG. 5.

FIG. 6 depicts internal components of the circuits 512-518 shown in FIG. 5. Generally speaking, the AI circuit 512 receives an AI signal from a field device via terminals 521 and 523, identifies a value represented by the AI signal, and transmits the value via a second, different signal to the controller 358 via the controller input 525.

The AI circuit 512 includes (i) terminals 521 and 523 for connecting to the circuit shown in FIG. 5 that connects to the interface 425; (ii) a controller input 525 linked to the controller 358 via the connector 429 and the link 431; (iii) an analog DC current monitor 612 electrically linked to the terminals 521 and 523; and (iv) a frequency modulation (FM) transceiver 614 electrically linked to the terminals 521 and 523.

The monitor 612 measures an electrical property (e.g., a current or voltage) of an analog signal received via the terminals 521 and 523 and generates a value based on the measurement. For example, a 4-20 mA signal may be transmitted by a flow meter having a range of 0-200 gpm, and thus a current 12 mA may represent a value of 100 gpm. The monitor 612 may transmit the value of 100 via a digital signal transmitted to the controller 358 via the controller input 525.

The FM transceiver 614 may transmit and receive values via a digital signal superimposed on the analog signal received via the terminals 521 and 523 (e.g., conforming to the HART standard). For values received via this superimposed signal, the FM transceiver 614 may forward the values to the controller 358 via the controller input 525. Similarly, the FM transceiver may receive commands or values from the controller 358 and forward the commands or values to the field device via the superimposed signal on the I/O channel connected to the terminals 521 and 523.

Turning to the AO circuit 514, in operation the AO circuit 514 receives a command or value from the controller 358 via the controller output 535 (e.g., carried by a digital signal), and transmits the command or value to a field device connected to the terminals 531 and 533 via an AO signal (e.g., by modulating the current or voltage of the AO signal to map to the command or value).

The AO circuit 514 includes (i) terminals 531 and 533 for connecting to the circuit shown in FIG. 5 that connects to the interface 425; (ii) a controller input 535 linked to the controller 358 via the link 431; (iii) an analog DC current control 622 electrically linked to the terminals 531 and 533; and (iv) a FM transceiver 624 electrically linked to the terminals 531 and 533, which is similar to the FM transceiver 614.

The current controller 622 receives a command or value from the controller 358 via the controller output 535 (e.g., carried by a digital signal) and, based on the command or value, drives a current of an AO signal on the I/O channel coupled to the terminals 531 and 533. Generally speaking, a field device operates based on the amplitude of the current on the I/O channel. For example, if the control 622 drives the current to 12 mA, a coupled field device may actuate a valve to open it to a position of 50% open (e.g., if the limits for the 4-20 mA signal are 0%-100% open). The FM transceiver 624 may transmit or receive a digital signal superimposed on the AO signal in a manner similar to that described with reference to the transceiver 614. In some instances, the AO signal is a voltage signal (e.g., +/−5V).

Turning to the DI circuit 516, the DI circuit 516 receives a DI signal from a field device via the terminals 541 and 543, identifies a value represented by the DI signal, and transmits the value via a second, different signal to the controller 358 via the controller input 545. The DI circuit 516 includes a discrete voltage monitor 632 that measures a voltage on an I/O channel coupled to the terminals 541 and 543. The monitor 32 identifies a value (e.g., 0 or 1) corresponding to the measured voltage and transmits the value to the controller 358 via the controller input 545 (e.g., via a digital signal). The DI signal may represent a relay, motor, or pump status (e.g., on or off). In some instances, the monitor 632 measures a discrete current signal.

Turning to the DO circuit 518, the DO circuit 518 receives a command or value from the controller 358 via the controller output 555 (e.g., carried by a digital signal), and transmits the command or value to a field device connected to the terminals 551 and 553 via a DO signal (e.g., by modulating the current or voltage of the DO signal to map to the command or value). The DO circuit 518 includes a discrete voltage control 642 that receives the command or value from the controller 358 and drives a voltage on the I/O channel coupled to the terminals 551 and 553 to a differential corresponding to the command or value. In some instances, the control 642 drives a discrete current signal (e.g., that signals via current amplitude).

IV. Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 5 shown in FIG. 1A. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

Throughout this specification, some of the following terms and phrases are used.

Communication Interface: Some of the described devices or systems include a "communication interface" (sometimes referred to as a "network interface"). A communication interface enables the system to send information to other systems and to receive information from other systems, and may include circuitry for wired or wireless communication.

A communication interface may enable the device of which it is a part to connect to components or to other computing systems or servers via any suitable network, such as a personal area network (PAN), a local area network (LAN), or a wide area network (WAN). In particular, the communication interface 806 includes circuitry for wirelessly connecting the device 801 to the field module 291 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link. A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Memory and Computer-Readable Media. Generally speaking, as used herein the phrase "memory" or "memory device" refers to a system or device including computer-readable media ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

A network may include dedicated routers responsible for directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

What is claimed:

1. A reconfigurable input/output device capable of facilitating communication between process controllers and field devices in a process control environment, the input/output device including:
   (A) a housing configured to be inserted into a socket of an assembly including a process controller;
   (B) a first communication interface disposed at least partially within the housing and configured to be coupled to one or more field devices disposed externally to the housing and within a process control environment;
   (C) a second communication interface disposed at least partially within the housing and configured to be communicatively coupled to a controller backplane of the process controller when the housing is inserted into the socket of the assembly; and
   (D) a plurality of circuits each coupled to the first communication interface and to the second communication interface and configured to establish communication between the one or more field devices and the process controller via a plurality of I/O channels between the plurality of circuits and the one or more field devices, wherein the plurality of circuits are configured to communicate with the one or more field devices and wherein each circuit is reconfigurable to communicate according to any one of a plurality of signal types such that the plurality of circuits are reconfigurable to communicate with the one or more field devices via a first circuit and a first I/O channel according to a first signal type and via a second circuit and a second I/O channel according to a second signal type.

2. The device of claim 1, wherein the field device is a first field device configured to according to a first signal type, and wherein the circuit is both:
   configurable to communicate according to the first signal type to enable the circuit to communicate with the first field device; and
   reconfigurable to communicate according to a second signal type instead of the first signal type such that, when the I/O channel is modified to replace the first field device with a second field device configured to communicate according to the second signal type, communication is enabled between the circuit and the second field device.

3. The device of claim 2, wherein the first signal type is selected from the group consisting of an analog signal and a discrete signal, and wherein the second signal type is different than the first signal type and selected from the group.

4. The device of claim 2, wherein the first signal type is selected from the group consisting of an analog input signal and an analog output signal, and wherein the second signal type is different than the first signal type and selected from the group.

5. The device of claim 4, wherein each of the analog input signal and the analog output signal are 4-20 mA signals.

6. The device of claim 2, wherein the first signal type selected from the group consisting of a discrete input signal and a discrete output signal, and wherein the second signal type is different than the first signal type and selected from the group.

7. The device of claim 6, wherein each of the discrete input signal and the discrete output signal is a 24V DC signal.

8. The device of claim 1, wherein the plurality of signal types comprises: an RTD signal and a thermocouple signal.

9. The device of claim 1, wherein the circuit is a first circuit;
   wherein the field device is a first field device;
   wherein the I/O channel is a first I/O channel coupling the first circuit to the first field device via the first communication interface; and
   wherein the one or more circuits includes: a second circuit configurable to communicate via the first communication interface according to any one of the plurality of signal types to enable the second circuit to communicate with a second field device coupled to the second circuit via the first communication interface and a second I/O channel between the first communication interface and the second field device.

10. The device of claim 1, further comprising:
    an I/O channel controller disposed in the housing and coupled to the one or more circuits, the I/O channel controller configured to:
    (i) receive, from a device external to the housing, a command to reconfigure a particular circuit to communicate according to a second signal type instead of a first signal type for which it is currently configured; and
    (ii) respond to the command by transmitting a signal to the particular circuit to cause the particular circuit to reconfigure to communicate according to the second signal type.

11. The device of claim 1, wherein each of the one or more circuits are configurable to communicate according to only one of the plurality of signal types at a given time.

12. The device of claim 1, wherein each of the one or more circuits are configurable to communicate according to two or more of the plurality of signal types at a given time.

13. A method of facilitating communication between process controllers and field devices via reconfigurable input/output devices in a process control environment, the method comprising:
- (A) inserting an input/output (I/O) device into a socket of an assembly that includes a process controller and a controller backplane between the process controller and the socket, wherein inserting the I/O device into the socket establishes sufficient contact between the I/O device and the controller backplane to enable communication;
- (B) operating the I/O device as an intermediary node that couples the process controller to one or more field devices via a plurality of I/O channels including a first I/O channel configured for a first signal type and a second I/O channel configured for a second signal type, including:
  - (i) communicating with the process controller via the controller backplane;
  - (ii) communicating via the first I/O channel utilizing signals of the first signal type and via the second I/O channel utilizing signals of the second signal type;
- (B) receiving, at the I/O device, a command to assign the second signal type to the first I/O channel; and
- (C) causing the I/O device to respond to receiving the command by reconfiguring itself to communicate via the first I/O channel according to the second signal type, such that when a field device configured for the second signal type is coupled to the I/O device via the first I/O channel, the I/O device facilitates communication between the process controller and the field device via one or more signals of the second signal type on the first I/O channel sublink.

14. The method of claim 13, wherein the first signal type is selected from the group consisting of an analog signal and a discrete signal, and wherein the second signal type is different than the first signal type and selected from the group.

15. The method of claim 13, wherein the first signal type is selected from the group consisting of an analog input signal and an analog output signal, and wherein the second signal type is different than the first signal type and selected from the group.

16. The method of claim 15, wherein each of the analog input signal and the analog output signal are 4-20 mA signals.

17. The method of claim 13, wherein the first signal type selected from the group consisting of a discrete input signal and a discrete output signal, and wherein the second signal type is different than the first signal type and selected from the group.

18. The method of claim 17, wherein each of the discrete input signal and the discrete output signal is a 24V DC signal.

19. The method of claim 13, wherein at least one of the first signal type and the second signal type is an RTD signal or a thermocouple signal.

20. The method of claim 13, wherein the first signal type is selected from a plurality of signal types and wherein prior to receiving the command, the I/O device is configured to operate by communicating via the first I/O channel according to only the first signal type and not according to any other of the plurality of signal types.

21. The method of claim 13, wherein the first signal type is selected from a plurality of signal types and wherein prior to receiving the command, the I/O device is configured to operate by communicating via the first I/O channel according to two or more of the plurality of signal types at a given time, wherein the two or more signal types do not include the second signal type.

22. The method of claim 13, wherein prior to receiving the command to assign the second signal type to the first I/O channel, the one or more field devices includes a first field device coupled to the I/O device via the first I/O channel and a second field device coupled to the I/O device via a second I/O channel.

23. The method of claim 13, wherein prior to receiving the command to assign the second signal type to the first I/O channel, the one or more field devices includes a given field device configured for multiple I/O channels, the given field device coupled to the I/O device via the first I/O channel and via the second I/O channel.

* * * * *